Oct. 7, 1958  S. RAPPAPORT ET AL  2,854,854
MATHEMATICAL FUNCTION GENERATOR
Filed Nov. 30, 1954  2 Sheets-Sheet 1
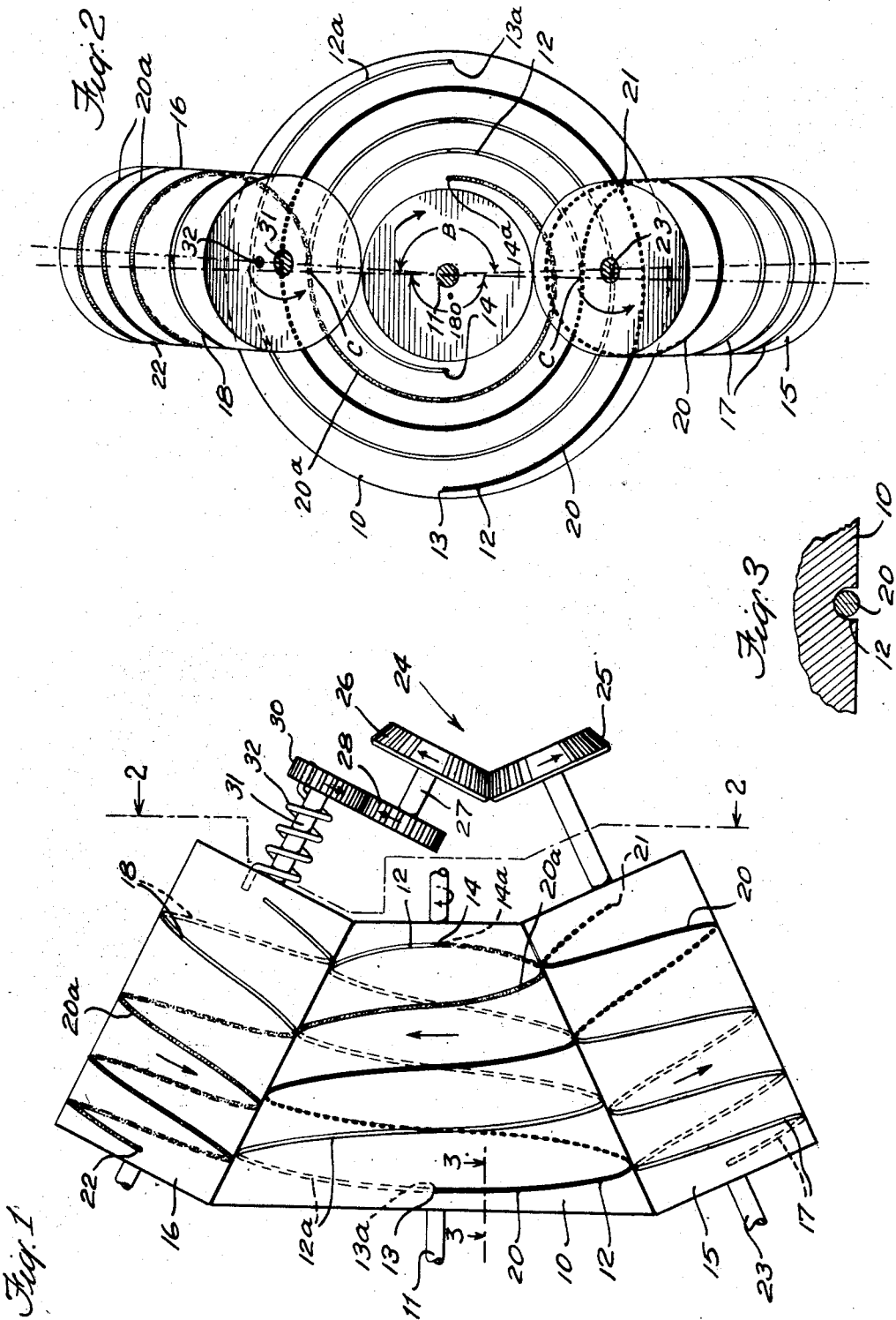

Oct. 7, 1958 — S. RAPPAPORT ET AL — 2,854,854
MATHEMATICAL FUNCTION GENERATOR
Filed Nov. 30, 1954 — 2 Sheets-Sheet 2

Inventors
SIGMUND RAPPAPORT
WILLIAM H. NEWELL
By Victor D. Borst
attorney

United States Patent Office 2,854,854
Patented Oct. 7, 1958

2,854,854

MATHEMATICAL FUNCTION GENERATOR

Sigmund Rappaport, Port Washington, and William H. Newell, Mount Vernon, N. Y., assignors to Sperry Rand Corporation, a corporation of Delaware Application November 30, 1954, Serial No. 472,157

13 Claims. (Cl. 74—39.3)

The present invention relates to computing mechanisms and more particularly to function generators for producing output mechanical actions, such as displacements or shaft rotations, which are definite mathematical functions of input mechanical actions. Although the invention, in certain aspects, may be embodied in any number of specific forms to obtain output mechanical quantities constituting innumerable predetermined mathematical functions of an input mechanical quantity, it is particularly useful in connection with function generators for obtaining the square function of an input quantity.

The function generator of the present invention is a belt cam mechanism consisting basically of an input cam, an output cam, and a belt in the form of a thin flexible slender element, such as a string or wire, wound spirally partly around one cam and partly around the other cam. In the case of a squaring function generator, the input cam is a cone in frustum form and the output cam is a cylinder. The form of the winding on the two cams is predetermined and assured by grooving.

The arrangement described with a single input cam, a single output cam and a single belt therebetween for certain uses is not feasible, since the input cam can rotate operatively only in one direction to drive the output cam. Rotation of the input cam in the opposite direction simply unwinds the belt and loosens it without rotating the output cam.

If two belts are applied to the input cam in the same spiral goove but with one starting at one end of said cam and the other at the other end and if the two belts are wound around the output cam and continued spirally therealong in opposite directions, upon rotation of the input cam in one direction, one belt will be wound around the input cam, thereby driving the output cam while the other belt will wind around the output cam as it unwinds from the input cam, thereby taking up the slack in the latter belt. Upon rotation of the input cam in the opposite direction, the actions of the two belts described will be reversed.

The disadvantage in this arrangement is that the two belts lying side by side in the same spiral groove cause a falsifying shift of the radius acting on the belts and also cause the belts to rub against each other, not only in the common spiral groove of the input cam but also in the transfer region between the two cams, where they cross as they pass from opposite sides of one cam to opposite sides of the other cam.

In an arrangement such as that described, if the two cams are spaced from each other a substantial distance, the spanning sections of the belts between the two cams will change in length as they are rotated, due to the varying contour of at least one of the cams, and the varying angle of approach of the belt between the two cams, thus producing an error in the required mathematical ratio of input and output angles.

As a feature of the present invention, there is provided an input cam consisting of a solid of revolution having two similar phasically displaced spiral grooves thereon to receive two belts therein respectively. Close to the input cam and spaced therearound according to the degree of phasic offset between the two spiral grooves are two similar output cams consisting of solids of revolution. The configurations of the input and output cams depend on the mathematical ratio required between input and output. The contours of the input and output cams where they come into close proximity are almost coincident, so that as these cams rotate relatively, the same adjoining contour relationship is maintained between the input cam and the output cams.

The two belts pass from the input cam on to the two output cams and continue thereon spirally in opposite directions. A drive connection is provided between the output cams and the output motion desired is taken off from the shaft of one of these output cams. This drive connection between the output cams permits the output shaft to rotate in either direction and causes the idle belt being unwound from the input cam to be wound around one of the output cams to take up the slack in this idle belt.

The arrangement described eliminates errors due to the changing belt length and angle of approach between input and output cams and permits smooth operation of the two belts without interference from each other.

A squaring function generator constructed in accordance with the present invention comprises an input cam in the form of a cone frustum carrying on its surface two spiral phasically displaced grooves of constant lead. The phase angle between the two spirals is preferably 180°, so that the starting points of these spirals are diametrically opposite. Two output cams in the form of cylinders are mounted rotatably, so that their axes are parallel to two diametrically opposite generatrices of the cone respectively and these output cams are located close to the surface of the cone without touching it. A belt is attached to the starting point of one of the spiral grooves on the larger end of the cone, is wound in some of the coils of this groove and passes on to one of the cylinders, where it continues its windings in a groove in said cylinder to one end of this cylinder. The belt is attached to this cylinder at this end.

A second belt starts on the other spiral groove on the smaller end of the cone and ends its windings in a groove on the second cylinder to which it is attached. The two cylinders are connected by a gear drive. One of the cylinders is spring-loaded to take up back lash and to maintain constant belt tension.

Various other objects, features and advantages of the present invention are apparent from the following particular description and from inspection of the accompanying drawings, in which:

Fig. 1 is a top plan view of a mechanical square function generator constituting one embodiment of the present invention;

Fig. 2 is an end elevation, partly in section, of the mechanical square function generator shown in Fig. 1, taken along the lines 2—2 of Fig. 1;

Fig. 3 is a detail section of the mechanical square function generator taken on lines 3—3 of Fig. 1;

Figure 5:
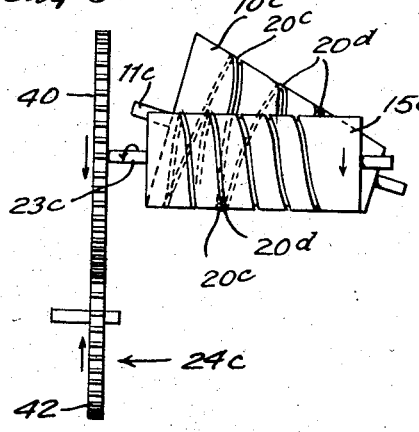
Fig. 5 is a side elevation of a mechanical square function generator constituting another embodiment of the present invention.

Figs. 1 and 2 show the invention applied to a squaring function generator which comprises an input cam 10 in the form of a cone and more specifically the frustum of a cone. The mechanical input displacement is applied in the form of a rotational movement to an input shaft 11 rigid with the cone 10 and passing through the axis thereof. On the cone 10 is a spiral groove 12 of constant lead starting at the point 13 near the larger end of the cone and terminating at a point 14 near the smaller end of the cone. A second spiral groove 12a, having a constant lead similar to that of the spiral groove 12, starts at a point 13a near the larger end of the cone 10 and diametrically opposite the point 13 and terminates at a point 14a near the smaller end of the cone and diametrically opposite point 14. The two spiral grooves 12 and 12a will thereby be identical but will be phasically offset 180°.

Extending along the cone 10 near diametrically opposite sides thereof, are two output cams 15 and 16 in the form of cylinders of the same size having their axes parallel to the respective generatrices of the cone on these diametrically opposite sides. These cylinders 15 and 16 are very close to but do not contact the cone 10 and have respective identical helical grooves 17 and 18. If the spiral grooves 12 and 12a on the cone 10 are right-handed, the helical grooves 17 and 18 on the cylinders 15 and 16 are left-handed, and vice versa. A belt 20 in the form of a flexible, slender, non-stretchable element, such as a thin metal wire, preferably in the order of .01 of an inch in diameter, is fixed to the cone 10 at the starting point 13 of the spiral groove 12 and is wound partially around said cone in the spiral groove 12. The belt 20 then passes over onto the cylinder 15 wherein it continues around said cylinder in its helical groove 17 towards its right end (Fig. 1) where it is affixed to said cylinder at point 21. A second belt 20a similar to the belt 20 is affixed to the cone 10 at the starting point 14a of the spiral groove 12a, is wound partially around said cone in said spiral groove and passes over onto the cylinder 16 where it continues thereon in its helical groove 18 towards its left end where it is affixed to said cylinder at point 22.

One of the cylinders, as for example the cylinder 15, has rigid therewith a shaft 23 from which the output mechanical displacement is drawn off and between the cylinders 15 and 16 is a drive 24 comprising a bevel gear 25 on the output shaft 23, meshing with an idler bevel gear 26 on a shaft 27 carrying an idler spur gear 28 which meshes with a spur gear 30 on a shaft 31 of the cylinder 16. The drive 24 and its gear ratio is such as to cause the two cylinders 15 and 16 to rotate in the same direction at the same rate.

To take up back-lash in the gears of the drive 24 and to maintain a constant tension in the belts 20 and 20a, there is provided a torsion spring 32 wound around the shaft 31 and having one end affixed to the cylinder 16 and the other end affixed to the gear 30. This shaft 31 is rigid with the cylinder 16 but is free to rotate in the gear 30, so that said gear is urged rotatively by the torsion spring 32 to serve the functions described.

In the computing device described, the output rotation is a function of the square of the input rotation, as will be shown mathematically hereinafter.

Assuming that the input shaft 11 is rotated clockwise (Fig. 2), this will cause the cone 10 to rotate in the corresponding direction and will therefore cause the belt 20 to wind around the cone in its spiral groove 12 from its larger end towards its smaller end. The consequent tension on the belt 20 acting on the cylinder 15 will drive the cylinder counterclockwise (Fig. 2) and will cause the belt to unwind itself from said cylinder and out of the helical groove 17. This operation will rotate the output shaft 23 an amount which is a function of the square of the input rotation. This counterclockwise rotation of the output shaft 23 on the cylinder 15 is transmitted by the drive 24 to the cylinder 16, which is also rotated thereby counterclockwise the same amount. This causes the belt 20a, which is being unwound from the cone 10 by its clockwise rotation described, to wind itself around the cylinder 16 in the helical groove 18 therein at the rate it is being unwound from the cone 10, thereby taking up the slack in the belt 20a.

Assuming the input shaft 11 to be rotated counterclockwise (Fig. 2), this will cause the cone 10 to rotate in the corresponding direction and will therefore cause the belt 20a to wind on the cone in its spiral groove 12a from its smaller end toward its larger end. The consequent tension on the belt 20a acting on the cylinder 16 will drive said cylinder clockwise (Fig. 2) and will cause this belt to unwind itself from said cylinder and out of the helical groove 18. This rotation of the cylinder 16 clockwise is transmitted through the torsion spring and the drive 24 to the cylinder 15 to cause said cylinder to rotate clockwise (Fig. 2) the same amount, so that the output shaft 23 from which the output quantity is derived rotates clockwise the right amount.

It is seen, therefore, that the device of the present invention will operate smoothly in either input direction, without the belts 20 and 20a rubbing or otherwise interfering with each other.

Figure 4:
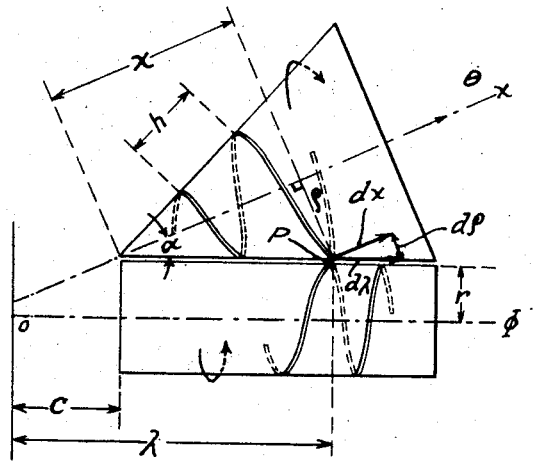
Fig. 4 is a diagram of a cone and a cylinder from which the mathematical relation of input and output angles therebetween can be determined.

The mathematical relationship between a conical spiral and a cylindrical spiral by which a squaring function is obtained is illustrated in Fig. 4 and analyzed herein. In the analysis, $\alpha$ is the cone angle (constant)

$\theta$ is the angular displacement of the cone around its $x$ axis $h$ is the constant pitch or lead of the conical spiral, measured along its generatrix $\rho$ is the instantaneous radius of the cone on the movable transfer point P (where the belt leaves the cone and enters the cylinder)

$\lambda$ is the distance of transfer point P from some arbitrary point O, measured along a line parallel to that generatrix of the cone which is adjacent to the cylinder, and hence parallel to the axis of the cylinder $\Phi$ is the angular displacement of the cylinder (being a variable depending on $\theta$)

From Fig. 4, the following relations hold:

$$d\lambda = \frac{dx}{\cos \alpha} \quad (1)$$

The lead $h$ of the cone spiral being constant:

$$x = K_1 \theta$$

where $$K_1 = h\frac{\cos \alpha}{2\pi} \quad (2)$$

The differential of the travel of transfer point P along the adjacent generatrices of cone and cylinder, namely, $d\lambda$, is, therefore, from (1) and (2), $$d\lambda = \frac{K_1}{\cos \alpha}d\theta = \frac{hd\theta}{2\pi} \quad (3)$$

It is required that the output displacement $\Phi$ be directly proportional to the square of the input displacement $\theta$. That is, $$\Phi = K_2 \theta^2 \quad (4)$$

where $K_2$ is constant.

Hence:

$$d\Phi = 2K_2 \theta d\theta \quad (5)$$

The lengths of the differentials of the arcs on both the cone and the cylinder have to be equal, since the length of the unwound belt on the cone has to be the same as the length rewound onto the cylinder and vice versa.

Hence:
$$\rho d\theta = r d\Phi \quad (6)$$

It must be proven that $r$, the radius of the cylinder, becomes a constant under the prevailing conditions.

From (6) and (5):
$$\rho d\theta = 2rK_2\theta d\theta \quad (7)$$
$$\rho = 2rK_2\theta \quad (8)$$

From (2) and (8):
$$= \frac{2rK_2}{K_1}x \quad (9)$$

and since, from Fig. 4, $\rho$ equals also $x \tan \alpha$, it follows that:

$$\tan \alpha = \frac{2rK_2}{K_1} \quad (10)$$

and $$r = \frac{K_1}{2K_2}\tan \alpha$$

and hence is a constant, thus establishing the fact that the combination of cone and cylinder have the correct geometrical properties for generating a true square function.

It is seen, therefore, that the device shown in Figs. 1 and 2 presents no theoretical errors due to assumptions, simplifications or approximations, as in the case of devices operating on an empirical basis.

In the arrangement shown in Figs. 1 and 2, the belts 20 and 20a transfer from respective points on the periphery of the cone 10 almost directly onto respective points on the cylinders 15 and 16 adjoining and directly opposite thereto. Since the pitch of the two spiral grooves 12 and 12a on the cone 10 is uniform for successive coils thereon and the effective diameter of the cone varies therealong, the lengths of successive spiral coils on said cone also vary. Therefore, for successive equal increments of rotation of the cone 10, the increments of travel of the transfer sections of the belts 20 and 20a along the cylinders 15 and 16 will vary progressively. To compensate for such variations in the rate of travel of these transfer belt sections relative to the rate of rotation of the cone 10, the pitches of the helical grooves 17 and 18 on the cylinders 15 and 16 respectively increase progressively towards the smaller end of the cone, as is shown schematically in Fig. 1. This change in pitch of the spiral on the cylinder can be mathematically derived with comparative ease.

The two spiral grooves 12 and 12a have been described as being phasically offset 180°. With this arrangement, the points of tangency of the two belts 20 and 20a on the cone 10 are 180° apart. Although the two cylinders 15 and 16 have been described as being disposed on diametrically opposite sides of the cone 10, actually these cylinders are spaced slightly less than 180° apart as shown by the angle B in Fig. 2, to compensate for the tangential spanning of the belts 20 and 20a across the short clearances between the cone and the cylinders and to assure thereby a spacing of 180° between the points of tangency C of the belts 20 and 20a on the cone 10.

Although the spiral grooves 12 and 12a have been described as being offset 180° apart, as far as certain aspects of the invention are concerned, these grooves may be phasically offset any suitable amount, as long as the cylinders 15 and 16 are correspondingly located in relation to the cone 10.

Figure 6:
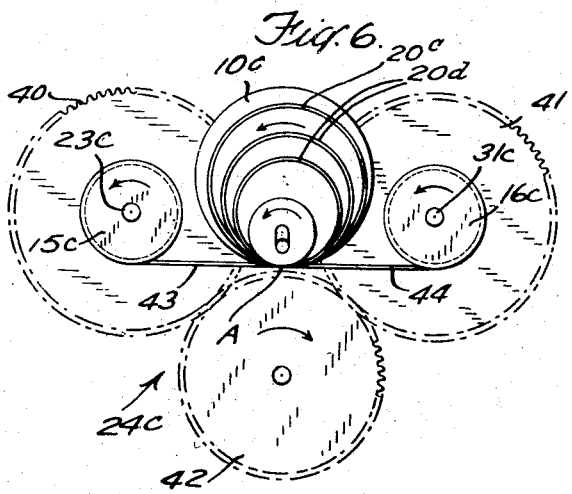
Fig. 6 is an end view of the function generator of Fig. 5.
Figure 7:
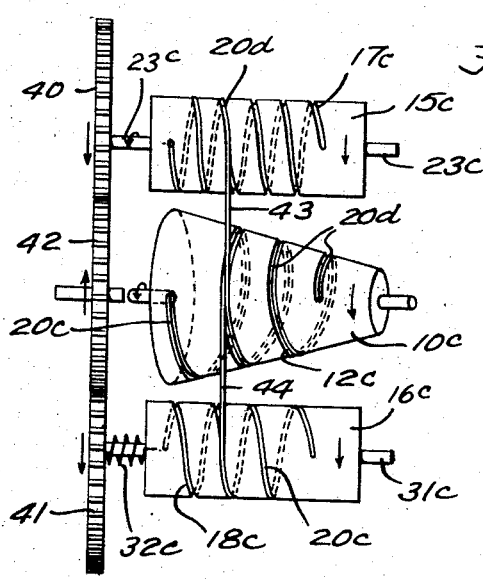
Fig. 7 is the bottom plan view of the function generator of Fig. 5.

In certain cases, it may be desirable to space the cylinders away from the cone, instead of bringing them up close to the cone, as in the construction of Figs. 1 and 2. In that case, if the cylinders are arranged with their axes parallel to the axis of the cone, the straight transfer parts of the belts spanning the cone and the cylinders will change their lengths, as the belts progress along these cam elements, thus causing an error in the desired mathematical ratio of input and output angles. As far as certain aspects of the invention are concerned, this difficulty can be partially met by making the rotational axes of the cone and the cylinders not parallel but relatively tilted, so that the axes of the cylinders are parallel to a generatrix on the cone or to a pair of spaced generatrices respectively on said cone. Figs. 5, 6 and 7 show an arrangement which, although not as desirable as the arrangement of Figs. 1 and 2, does embody certain features of the invention.

In the embodiment of Figs. 5, 6 and 7, there is a cone frustum 10c and two cylinders 15c and 16c flanking said cone and arranged with their axes parallel to a master generatrix A on said cone. The cone 10c is mounted on an input shaft 11c and the two cylinders 15c and 16c are rigidly mounted on shafts 23c and 31c respectively, one of these shafts, as for example shaft 23c, constituting the output shaft. Between the two shafts 23c and 31c is a drive 24c comprising gears 40 and 41 on said shafts respectively and an idler gear 42 therebetween. The shaft 31c is loose on the gear 41, but a torsion spring 32c between this gear and the cylinder 16c ties this gear and this cylinder together and at the same time takes up backlash and maintains tension on the belts to be described.

The cone 10c is shown with a single spiral groove 12c of constant lead and the two cylinders 15c and 16c are provided with spiral grooves 17c and 18c respectively. Two belts 20c and 20d are wound in the spiral cone groove 12c and pass on to the cylinders 15c and 16c, where they continue in the grooves 17c and 18c therein.

The operation of the device of Figs. 5, 6 and 7 is apparent from what has been described in connection with the construction of Figs. 1 and 2.

One disadvantage in the arrangement of Figs. 5, 6 and 7 which is avoided by the construction of Figs. 1 and 2 is that the belts 20c and 20d extending tangentially from the same region of the cone periphery may rub against each other. This can be avoided by arranging one cylinder with its axis parallel to one generatrix of the cone and arranging the other cylinder with its axis parallel to another generatrix of the cone spaced 180° from the first generatrix. The cone can then be provided with two similar spiral grooves 180° apart as in the construction of Figs. 1 and 2 and the transfer sections of the belts can be maintained not only uniform in length but separate and apart with no interference therebetween.

Another disadvantage in the construction of Figs. 5, 6 and 7 over that disclosed in the construction of Figs. 1, 2 and 3 is that the straight spanning sections 43 and 44 of the belts 20c and 20d, in spite of the relative positions of the cone 10c and the cylinders 15c and 16c, still vary for different rotative positions of the cone 10c, thereby introducing an error and an inaccuracy in the operation of the construction of Figs. 5, 6 and 7. There may be certain cases where accuracy is not so important and a certain amount of error can be tolerated. In such cases, the construction of Figs. 5, 6 and 7 may be useful.

In the embodiment of the inventions so far described, the input member has been described as a cone and the output member has been described as a cylinder, to obtain a squaring function between input and output. However, by reversing the relationship of these cam elements, so that the cylinder is the input member and the cone is the output member, a square root function is obtained.

Figure 8:
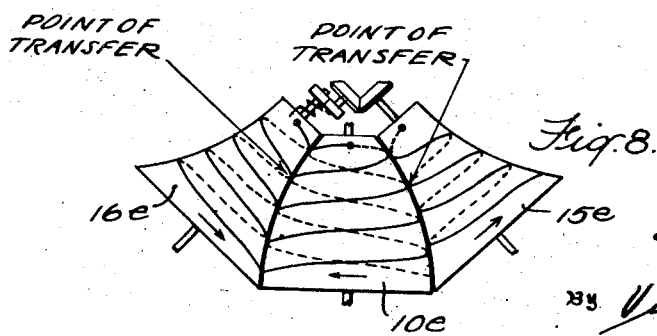
Fig. 8 is a top plan view of a mechanical function generator other than a squaring one embodying the present invention.

Also, the embodiment of the present invention may take other geometric forms according to the desired ratio required between the input and output angles. For example, in Fig. 8 there is shown an input cam member 10e and flanking output cam members 15e and 16e, these cam members being of geometric configurations different from those illustrated in Figs. 1–7, according to the mathematical relationship required between input and out angles. Since these cam members are in close conforming relationship, they necessarily constitute solids of revolution to maintain this relationship as they are rotated. In all other respects, the function generator of Fig. 8 is similar to that of Figs. 1 and 2.

In the following claims, two cams are considered to have "conforming contours" when they have common surface lines (neglecting the slight spacing between the cams), regardless of whether their axes are in the same plane or different planes. For example, in the case of a rotary hyperboloid and a rotary cylinder with their axes in askew relationship or in different planes, they will nevertheless have common straight line generatrices and therefore will have "conforming contours" under the definition indicated.

While the invention has been described with reference to specific embodiments, it is to be understood that it is not to be limited thereto but is to be construed broadly and restricted solely by the scope of the appended claims.

What is claimed is:

1. A mechanical function generator comprising an input cam, an output cam, a belt partially wound spirally around one of said cams, passing tangentially therefrom and tangentially onto the other cam and continuing spirally around the latter cam towards one end, whereby upon rotation of the input cam in a direction to wind the belt around the input cam, the output cam is driven through a predetermined angle in relation to the input angle, said cams constituting solids of revolution and having respective straight line generatrices, at least one of said cams being conical in shape, said cams being disposed with their respective generatrices where the belt is tangent to the cams extending parallel, and means for spirally guiding said belt around said cams along predetermined paths, said belt being tangent to said cams at points along the latter respective generatrices in any operative position of said input cam, the length of the section of the belt spanning the cams between the tangent points of the two cams in any rotative operative position of said input cam remaining constant.

2. A mechanical function generator as described in claim 1, wherein the input cam is a cone and the ouput cam is a cylinder.

3. A mechanical function generator comprising an input cam, a pair of similar output cams alongside of said input cam spaced around said input cam, at least one of said cams being of varying diameter, and a pair of belts spirally wound partially around said input cam with equal pitch, passing off to said output cams respectively and continuing spirally around said output cams in directions whereby, upon rotation of the input cam in one direction, one belt winds around the input cam and unwinds from one of the output cams to drive the latter output cam, while the other belt unwinds from the input cam, and whereby, upon rotation of the input cam in the opposite direction, the operations of said belts are reversed, and a drive connection between said output cams for rotating said output cams in directions to cause one belt to wind on one output cam and the other belt to unwind at the same time from the other output cam.

4. A mechanical function generator as described in claim 3, comprising a torsion spring in said drive connection for taking up back-lash in said drive connection and for maintaining said belts under tension.

5. A mechanical function generator comprising an input cam constituting a solid of revolution, an output cam constituting a solid of revolution, said cams having conforming contours and being disposed alongside of each other in close conforming relationship with respective generatrices almost common and touching whereby, in all rotative positions of the cams, they will maintain their close conforming relationship, and a belt spirally wound on the input cam, passing over to the output cam and continuing spirally along the output cam, whereby, upon rotation of the input cam in a direction to wind the belt around the input cam, the output cam is driven through a predetermined angle relative to the angle of rotation of the input cam.

6. A mechanical function generator comprising an input cam, an output cam, one of said cams being in the form of a cone, the other member being in the form of a cylinder, said cylinder being arranged alongside of and close to the cone in approximate contact therewith with almost common respective generatrices and with the axis of the cylinder parallel to a generatrix of the cone, and a belt spirally wound on one cam, passing over to the other cam and continuing spirally along the latter cam, whereby upon rotation of the input cam in a direction to wind the belt around the input cam, the output cam is driven through a predetermined angle relative to the angle of rotation of the input cam.

7. A mechanical function generator comprising an input cam constituting a solid of revolution, a pair of similar output cams constituting solids of revolution and located alongside of said input cam, said output cams being spaced around said input cam and having respective contours conforming with the contour of the input cam, said output cams being disposed in close conforming relationship with the input cam in approximate contact therewith and with respective generatrices of said output cams almost common with corresponding generatrices of the input cam, whereby, in all rotative positions of the cams, the cams will maintain their close conforming relationship, spiral belt means between said input cam and said output cams for driving one of said output cams in one direction, when the input cam is rotated in one direction, and for driving the other output cam in the other direction, when the direction of the input cam is reversed, and drive means for driving the output cams simultaneously in directions to take up spirally slack on the belt means, regardless of the direction of rotation of the input cam.

8. A mechanical square function generator comprising an input cone, a pair of output cylinders spaced around the cone and arranged with their axes parallel to generatrices of the cone respectively, a pair of belts spirally wound partially around the cone, passing off to the cylinders respectively and continuing spirally around the cylinders in directions whereby, upon rotation of the cone in one direction, one belt winds around the cone and unwinds from one of the cylinders to drive the latter cylinder, while the other belt unwinds from the cone, and whereby, upon rotation of the cone in the opposite direction, the operations of the belts are reversed, and a drive connection between the cylinders for rotating the cylinders in directions to cause one belt to wind on one cylinder and the other belt to unwind at the same time from the other cylinder.

9. A mechanical square function generator as described in claim 8, wherein the cylinders are arranged close to and almost touching the cone, whereby errors due to changes in the length of the belt sections spanning the cone and the cylinders are eliminated or at least substantially reduced.

10. A mechanical square function generator comprising an input cone, a pair of output cylinders spaced around the cone and arranged with their axes parallel to generatrices of the cone respectively, said cylinders being arranged close to and almost touching the cone along said generatrices, said cone having a pair of similar spiral grooves thereon phasically offset an amount substantially equal to the angular distance between the cylinders with respect to the cone axis, each of said cylinders having a spiral groove thereon, the direction of the spiral groove on the cone being reversed from those on the cylinders, a first belt wound partially around the cone in one of the spiral grooves of the cone, passing onto one of the cylinders and continuing around the latter cylinder in the spiral groove of the latter cylinder towards one end thereof, a second belt wound partially around the cone in the other of the spiral grooves of the cone, passing onto the other cylinder and continuing around the latter cylinder in the spiral groove thereof towards the opposite end, the belts being wound on said cone and cylinders to cause the first belt to wind around the cone and unwind from the cylinder to which the first belt is wound to drive the latter cylinder and at the same time to unwind the second belt from the cone, when the cone is rotated in one direction, and to cause the second belt to wind around the cone and unwind from the cylinder to which the second belt is wound to drive the latter cylinder and at the same time to unwind the first belt from the cone, when the cone is rotated in the opposite direction, and a drive connection between the cylinders causing said cylinders to rotate in the same direction and causing thereby the belt being unwound from the cone to wind around the cylinder to which it is partially wound.

11. A mechanical square function generator as described in claim 10, wherein the spiral grooves on the cone have uniform lead and are displaced 180° apart and the spiral grooves on the cylinders have varying pitch to compensate for variations in the length of successive coils of the belts on the cone.

12. A mechanical square function generator as described in claim 10, wherein said cylinders are arranged around said cone at an angle slightly different from the angle between the phases of the spiral grooves on said cone to compensate for the tangential spanning of the belts across the short clearances between the cone and the cylinders and to assure thereby an angle of spacing between the points of tangency of the belts on the cone equal to the angle between the phases of the spiral grooves on the cone.

13. A mechanical function generator comprising an input cam, an output cam, a belt partially wound spirally around one of said cams, passing tangentially therefrom and tangentially onto the other cam and continuing spirally around the latter cam towards one end, whereby upon rotation of the input cam in a direction to wind the belt around the input cam, the output cam is driven through a predetermined angle in relation to the input angle, said cams constituting solids of revolution, at least one of said cams varying in diameter throughout its length, said cams being disposed with respective generatrices where the belt is tangent to the cams extending in the same direction throughout their lengths but never intersecting, and means for spirally guiding said belt around said cams along predetermined paths, said belt being tangent to said cams at points along the latter respective generatrices in any operative position of said input cam, the length of the section of the belt spanning the cams between the tangent points of the two cams in any rotative operative position of said input cam remaining constant.

References Cited in the file of this patent
UNITED STATES PATENTS

| | | |
|---|---|---|
| 2,179,841 | Cassidy | Nov. 4, 1939 |
| 2,349,118 | Simpson | May 16, 1944 |
| 2,485,200 | Imm | Oct. 18, 1949 |